July 28, 1931.   G. L. TULLY   1,816,752
GOGGLES
Filed June 25, 1928

GEORGE. L. TULLY Inventor

By Harry H. Styll.
Attorney

Patented July 28, 1931

1,816,752

UNITED STATES PATENT OFFICE

GEORGE L. TULLY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

GOGGLES

Application filed June 25, 1928. Serial No. 288,040.

This invention relates to improvements in ophthalmic mountings and has particular reference to protection, illumination and ventilation improvements in safety goggles.

The principal object is to provide means whereby the eye cup interior of an ophthalmic mounting may be well ventilated but shielded from external light rays.

Another object of this invention is to prevent the entrance of foreign bodies into the eye cup of an ophthalmic mounting.

Another object is to provide a simple means of detaching and inserting the shielding member of an ophthalmic mounting when desired.

Another object is to provide a shield or baffle for an ophthalmic mounting which can be removed without altering the external appearance of the mounting.

Another object is to provide an improved means for obtaining a free circulation of air in the eye cups of an ophthalmic mounting.

Other objects and advantages of the invention will become apparent from the following description taken in connection with the accompanying drawings and it will be apparent that many changes may be made in the details of construction and arrangement of parts without departing from the spirit of the invention as expressed in the accompanying claims. I, therefore, do not wish to be limited to the exact details of construction and arrangements shown and described as the preferred forms only have been shown by way of illustration.

Figure 1:
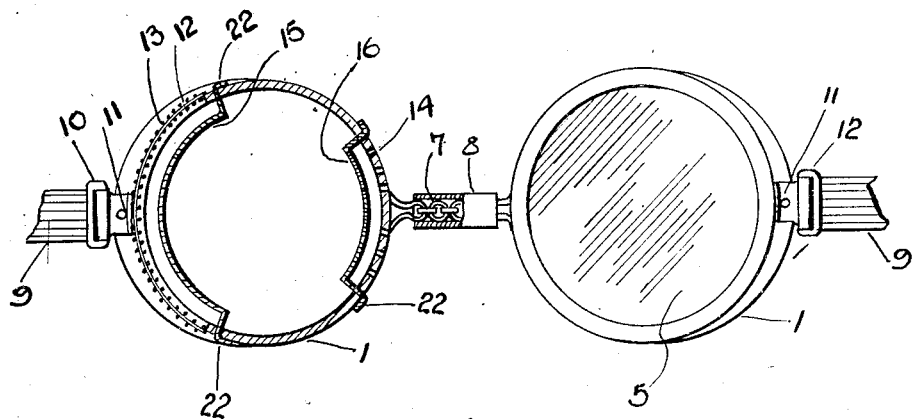
Fig. 1 is a top or plan view of an ophthalmic mounting with one eye cup in part section.
Figure 2:
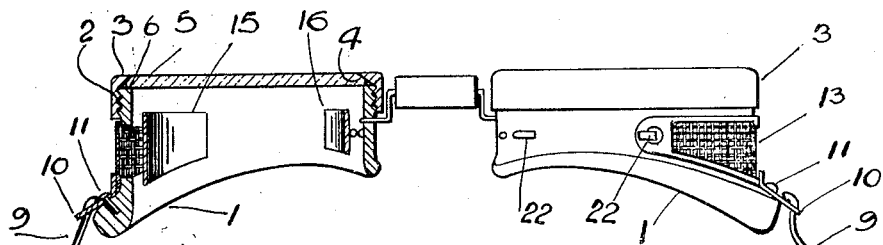
Fig. 2 is a front view or elevation of the mounting with one eye cup in cross section.
Figure 3:
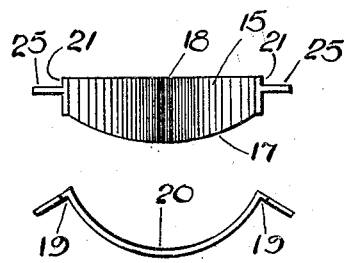
Fig. 3 is a plan and elevation of the large baffle or shield.

Welding and cutting operations are chiefly hazardous by reason of the invisible rays of light, such as ultra-violet and infra-red, which have very injurious effects upon the eyes exposed to them. A protective goggle, therefore, should totally exclude these harmful rays. This is accomplished to a fair degree by the use of proper light filtering lenses in a protective goggle, but in all such mountings some provision should be made for ventilating the interior of the eye cup. When this is done there is inevitably an influx of light rays through the ventilating holes which destroys the safety effect of the filtering lens. The intention of this device, therefore, is to provide a maximum of ventilation without permitting injurious light rays to enter, and from the following description it will be seen that extremely simple, novel and efficient means have been employed. Although this invention is principally effective in combating the danger of injurious light rays, it should be noted that the device can be readily removed, together with the light filtering or dark colored lens when it is desired to use the protective mounting for chipping or other purposes having an impact hazard. A plain glass lens can be inserted and the external appearance of the protective mounting is in no way altered by the removal of the device.

Referring to the drawings wherein similar reference numerals are used to denote corresponding parts throughout, the numeral 1 designates the eye cups of a protective mounting which are preferably made of molded fiber or similar material and shaped to fit snugly to the wearer's face. A screw thread 2 is molded into the periphery adjacent the upper end. A metal cap 3 with bevelled inner ledge 4 to hold the protection lens 5 snugly in position is screwed down upon each eye cup 1 and the protection lens 5 is held firmly upon the upper face 6 of the eye cup. The eye cups are flexibly connected by a chain 7 which is covered by an insulating tube 8 forming a bridge by which the distance between the eye cups 1 can be adjusted if desired by twisting the said eye cups once or twice. A headband 9 is attached to the temporal side of the eye cups 1 by means of plates 10 which are riveted at 11. Ventilation is supplied at the temporal side by means of the large slot 12 which is covered by a fine wire mesh screen 13. A large quantity of air can enter and circulate across the eye cup 1 to the nasal side where a series of small holes 14 extending in a horizontal line for a short distance each side of the bridge serve to ventilate the eye cup from the nasal side.

By having a large screen covered opening on the temporal side and small openings on the nasal side a ventilating effect is created which acts by drawing air through the screen on the temporal side and circulating it across the eye cup to emerge at the small holes on the nasal side. This novel ventilating means is particularly beneficial for welders or any workmen who are near great heat as in a badly ventilated goggle the lens soon gets covered with moisture and has to be removed for cleaning quite frequently. Also the lack of cool air in the eye cups is a source of discomfort to the wearer by making the eye cups hot and the eyes inflamed.

The device for excluding the light rays, yet permitting a high degree of ventilation, is in the form of metal baffle plates or shields. The larger baffle or shield 15 is fitted to the temporal side of each eye cup 1 and a smaller baffle or shield 16 to the nasal side.

The baffles or shields are preferably made of sheet metal and are large enough to cover the ventilation holes without touching the face of the wearer. The lower edge 17 is curved symmetrically with the related edge of the eye cup 1 and the top edge 18 can be straight and flat. A small portion 19 at each end of the baffle or shield is bent in angular relation to the main surface 20 which in turn is curved to a radius slightly less than that of the internal radius of the eye cup 1. The baffle plates stand away from the internal surface of the eye cup so as to allow air to circulate freely. This distance is adjusted by means of the angular portions 19 which have tongues or prongs 25 cut into them so that a shoulder 21 is formed. This shoulder butts against the internal surface of the eye cups and thereby holds the baffle plates in correct adjustment. The tongues or prongs 25 are fitted into holes formed for the purpose in the eye cup and the protruding ends can be bent back at 22 to hold the plate firmly in position. The plates can be painted with a non-reflecting color such as dull black. The plates can be removed by bending back the tongues or prongs 25 from the eye cups at 22 and pushing them through the holes. The material used is of malleable enough nature to allow frequent bending of the tongues without fracture. Any light entering the eye cups through the ventilation openings is prevented from reaching the eyes of the wearer by the novel device described. Free ventilation is assured and also immunity from injury caused by the entrance of foreign bodies, as the larger ones will be unable to enter through the small orifices and the smaller ones will be caught by the baffles or shields.

From the foregoing it will be seen that the invention supplies an added protection for an ophthalmic mounting above that provided by the use of light filtering lenses for welding operations especially. The quick removal of the device without altering the external appearance of the mounting facilitates the use of the protection mounting for other work. In chipping, stone-cutting, etc., the baffles or shields can be removed, together with the dark colored light filtering lenses and by the insertion of plain glass lenses all the light required in these operations is permitted to pass.

Having described my invention, I claim:

1. A device of the character described comprising a pair of connected eye cups having ventilation openings on the nasal and temporal sides and additional openings beyond the ventilation openings, and baffle plates over the ventilation openings and spaced from the interior walls of the cup and having tongues extending into the additional openings to hold the baffle plates in related position to the ventilation opening.

2. A device of the character described comprising a pair of connected eye cups each having ventilation openings on the temporal and nasal sides, an arcuate baffle plate of substantially the extent of the temporal opening spaced internally from the walls of the eye cup and parallel thereto, means adjacent the ends of said plate connecting it to the eye cup, a second arcuate baffle plate of substantially the extent of the nasal opening spaced internally from the walls of the eye cup and parallel thereto, and means adjacent the ends of said plate connecting it to the eye cup.

3. A device of the character described comprising a pair of connected eye cups having a relatively long ventilation slot on the temple side and a series of relatively small ventilation openings on the nasal side, an arcuate baffle plate of substantially the extent of the temporal opening spaced internally from the walls of the eye cup and parallel thereto, means adjacent the ends of said plate connecting it to the eye cup, a second arcuate baffle plate of substantially the extent of the nasal openings spaced internally from the walls of the eye cup and parallel thereto, and means adjacent the ends of the said plate connecting it to the eye cup.

GEORGE L. TULLY.